United States Patent [19]

Suzuki et al.

[11] Patent Number: 4,825,252

[45] Date of Patent: Apr. 25, 1989

[54] COLOR ZOOM COPYING APPARATUS

[75] Inventors: Minoru Suzuki; Nobutaka Minefuji, both of Tokyo, Japan

[73] Assignee: Asahi Kogaku Kogyo Kabushiki Kaisha, Tokyo, Japan

[21] Appl. No.: 204,618

[22] Filed: Jun. 9, 1988

[30] Foreign Application Priority Data

Jun. 12, 1987 [JP] Japan ................................ 62-146659

[51] Int. Cl.[4] ........................ G03B 27/32; G03B 27/52

[52] U.S. Cl. ........................................ 355/32; 355/35; 355/38; 355/55

[58] Field of Search ........................ 355/32, 35, 38, 55

[56] References Cited

U.S. PATENT DOCUMENTS 4,095,879 6/1978 Katayama et al. .

4,746,955 5/1988 Slayton et al. ........................ 355/35

FOREIGN PATENT DOCUMENTS 49-123039 11/1974 Japan .

55-30232 8/1980 Japan .

60-257441 12/1985 Japan .

62-265643 11/1987 Japan .

*Primary Examiner*—Monroe H. Hayes

*Attorney, Agent, or Firm*—Sandler & Greenblum

[57] ABSTRACT

A color zoom copying apparatus is provided having a slide base which holds one lens group comprising part of a zoom lens system, and which can move in the optical axis direction of the zoom lens system. The apparatus includes structure for driving the slide base along the optical axis direction in accordance with the magnification of the zoom lens system, a movable lens frame which supports another lens group of the zoom lens system and which is supported on the slide base so as to move in the optical axis direction, and a first adjusting device for moving the movable lens frame relative to the slide base in order to correct deviations in the focus of the zoom lens system which occur as a result of variations in magnification, in accordance with displacement of the slide base. A plurality of color filters which can be independently inserted into, and retracted from, the optical path of the zoom lens system, are provided, and a second adjusting device is provided for moving the movable lens frame, independently of movement of the first adjusting device, in order to correct deviations of focus which are produced when a specified colored filter is inserted into the optical path of the zoom lens system, in association with insertion of the specified color filter.

16 Claims, 9 Drawing Sheets

COLOR ZOOM COPYING APPARATUS

BACKGROUND OF THE INVENTION

1. Field of the Invention

The present invention relates to a color zoom copying apparatus, and more precisely relates to a color separating device therefor.

2. Description of Related Art

In a conventional color zoom copier, a zoom lens is used as an imaging optical system, and image data of an object are separated into three colors, i.e., R (Red, 620 nm), G (Green, 525 nm), and B (Blue, 450 nm) to successively make latent images on a photoconductive drum. These latent images are developed with yellow, magenta, and cyanine and are superimposed to produce a color copy.

FIG. 7 shows a copying system of a known color zoom copier. In FIG. 7, a scanning unit S having therein an illuminating light source 12 and scanning mirrors 13 and 14 is provided below a transparent glass plate 11 on which an object (document) 0 is located. The scanning unit S having the illuminating light source 12 and the scanning mirrors 13, 14 incorporated therein is scanned from a position shown by a solid line S to a position shown by an imaginary line S'(12', 13' 14'). The light which is emitted from the light source 12 (12') is reflected by the document 0 and then by the mirrors 13 and 14 and is transmitted onto a photoconductive drum 17 through a wavelength selecting filter (color separating mechanism) 15, an imaging optical system 16, and immovable mirrors $M_1$, $M_2$, $M_3$. On the circumference of the photoconductive drum 17 are provided various known color copying elements, such as a charger 18, a developing unit assembly 19 having developing units (**19*a* for yellow, 19*b* for magenta, 19*c* for cyanine and 19*d* for black) corresponding to the respective selected wavelengths, and a transfer unit 20, etc. In FIG. 7, numeral 21 designates a paper on which the image is to be copied, and 22** a paper feeder therefor.

The zoom lens system 16 has a front group of movable lenses (which will be referred to as a front lens group $L_1$) and a rear group of movable lenses (which will be referred to as a rear lens group $L_2$). The zoom lens system 16 varies the spatial distance between the front lens group $L_1$ and the rear lens group $L_2$ and moves to vary the imaging magnification (i.e., the copy magnification) without changing the distance between the object and the image. FIG. 9 shows typical tracks of movement of the lens groups $L_1$ and $L_2$ in accordance with the variation of magnification, in a known device.

In the known arrangement shown in FIG. 7, the color separating mechanism 15 which is located in front of the zoom lens system 16 successively inserts color filters of the three (or four) colors R, G and B (and M for monochrome, if necessary) in the optical path of the zoom lens system to effect color separation. Alternatively, it is also known to arrange, between the light source 12 and the document 0, the color separating mechanism in which the color filters R, G and B are selectively inserted in the optical path to carry out color separation. When the scanning unit S is scanned for the respective colors, image data (i.e., the latent image) which are essentially separated into three colors R, G and B are formed on the photoconductive drum 17.

In the developing unit assembly 19, the developing unit (yellow) **19*a* is used for the latent image which is formed by the color filter B, the developing unit 19*b* (magenta) for the latent image which is formed by the color filter of G, and the developing unit 19*c* (cyanine) for the latent image which is formed by the color filter R. The latent images developed on the photoconductive drum 17 are superimposed on the same paper 21** to obtain a desired color copy.

In the color zoom copier, when color separation is effected and the magnification is changed, as mentioned above, an image is out of focus due to the chromatic aberration of the lenses in accordance with the color and the copy magnification. FIG. 8 shows examples of positions of focal points of the zoom lens system when the color filters G, B and R are inserted in the optical path, and a deviation in focus (i.e., amount of defocus), in accordance with variation in the magnification.

It is apparent that the deviation decreases the quality of the image and, accordingly, it is desirable to control the zoom lens system 16, so that the focal points are always located on the photoconductive drum 17.

SUMMARY OF THE INVENTION

The primary object of the present invention is to provide a color zoom copying appraatus having a simple mechanism which can correct deviations in focus depending upon colors of the color filters to be used and the variation in copy magnification with a practically acceptable accuracy.

To achieve the objects of the invention mentioned above, according to the basic concept of the invention, in addition to adjustment of the spatial distance between the lens groups, which adjustment is conventionally effected to correct the focus in accordance with variations in the magnification provision is made for means for correcting the focus which depends upon colors of the color filters.

According to one aspect of the present invention, there is provided a color zoom copying apparatus having a light source for illuminating an object, a zoom lens system which has a plurality of groups of lenses for projecting an image of the illumiated object, a photoconductive body which receives the image of the object from the zoom lens system, and a color separating device for separating the image of the object into several colors to transfer the image thus separated onto the photoconductive body, wherein the improvement comprises a slide base which holds one of the lens groups and which can move in the optical axis direction of the zoom lens system, means for driving the slide base in the optical axis direction in accordance with the magnification of the zoom lens system, a movable lens frame which supports the other lens group and which is supported on the slide base so as to relatively move in the optical axis direction, first adjusting means for moving the movable lens frame relative to the slide base to correct the deviation in focus of the zoom lens system which takes place due to the variation of magnification, in accordance with the displacement of the slide base, a plurality of color filters which can be independently inserted in and retracted from the optical path of the zoom lens system, and a second adjusting means for moving the movable lens frame, independently of the movement thereof by the first adjusting means, to correct the deviation in focus which is produced when a specified color filter is inserted in the optical path of the zoom lens system and which is determined by the color of the specified color filter, in association with the insertion of the specified color filter.

The first adjusting means performs a correction of the deviation of focus caused by variations in the magnification by adjusting the spatial distance between the lens groups. This correction is per se known. One of the most significant features of the present invention resides in the provision of the second adjusting means, in addition to and in combination with the first adjusting means. The second adjusting means corrects deviations in focus which is caused when a specified one of the color filters is inserted in the optical path of the zoom lens system and which is determined by the color of the specified color filter, and by moving the movable lens frame to a correct position different from a position in which the movable frame is brought by the first adjusting means.

With additional adjustment of the movable lens frame by the second adjusting means, the deviation in focus which takes place when the magnification is changed and when the color filters are inserted in the optical path of the zoom lens system to carry out the color separation can be substantially completely absorbed, so that the image can be formed on a correct focal point, resulting in increased image quality.

DETAILED DESCRIPTION OF THE INVENTION

Figure 6:
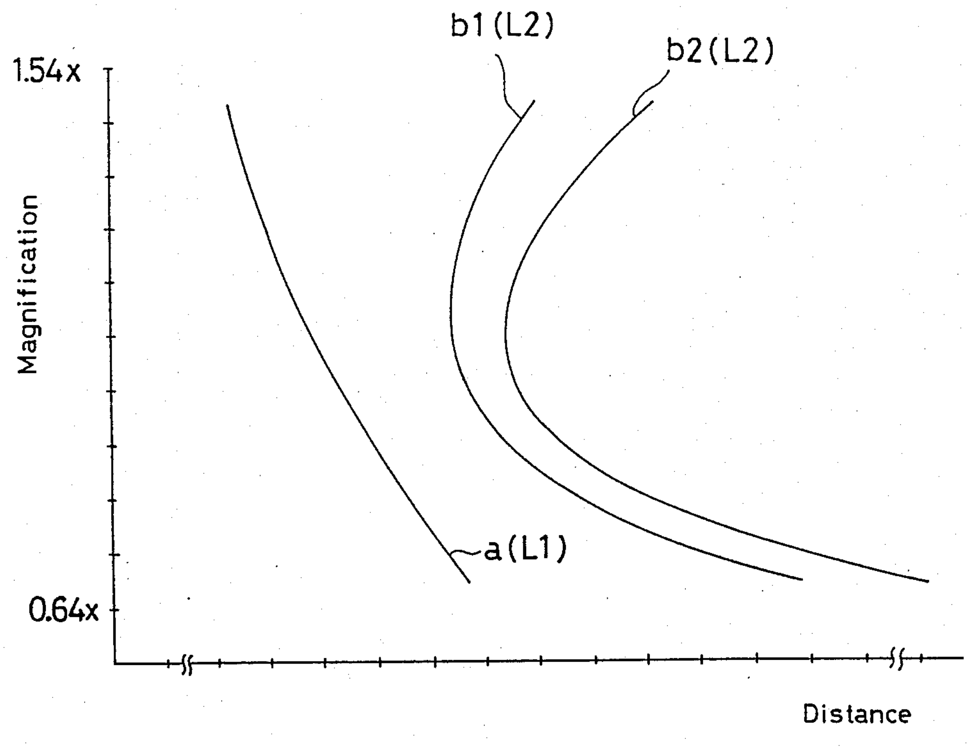
FIG. 6 is a diagram showing one example of tracks for movement of front and rear groups of movable lenses of a zoom lens system in the present invention.

The basic concept of the invention will be first discussed below with reference to FIGS. 6 to 8.

Figure 8:
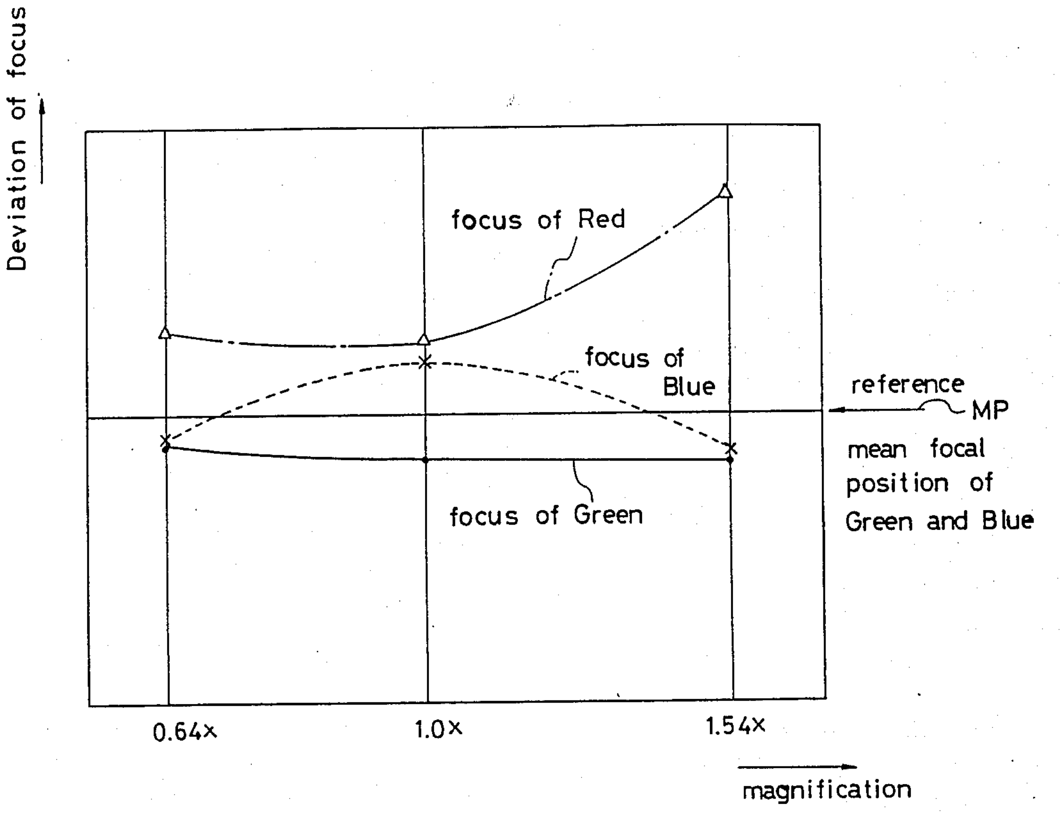
PRIOR ART Fig. 8
FIG. 8 is a diagram showing deviations in focus depending upon the colors of color filters; and, FIG. 9 is a schematic view showing tracks of travel of known two-group zoom lens.
Figure 9:
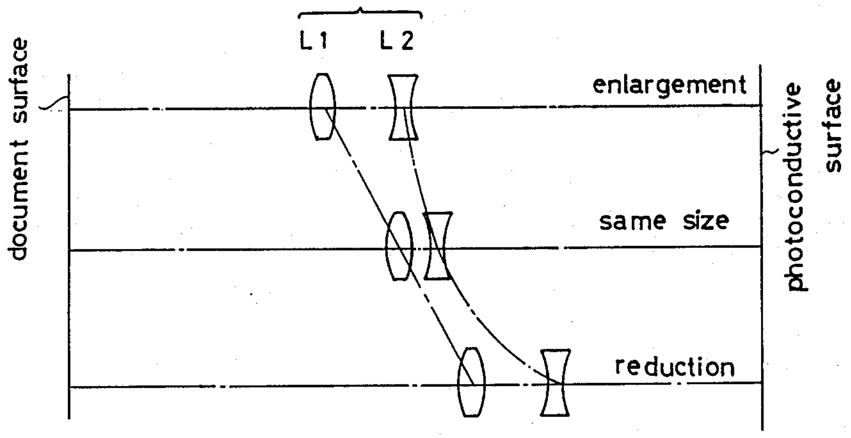
PRIOR ART Fig.9

Supposing that the invention is applied to an optical system having chromatic aberration characteristics, as shown in FIG. 8, a front group of movable lenses of a zoom lens system 16 which will be referred to as a front lens group $L_1$ is moved along a track a (FIG. 6) in accordance with the change in magnification, and a rear group of movable lenses wich will be referred to as a rear lens group $L_2$ is moved along tracks $b_1$ and $b_2$ when the color filters G and B are inserted in the optical path of the zoom lens system and when the color filter R is inserted in the optical path to adjust the deviation of focus within an allowable range in accordance with colors, respectively. Namely, in FIG. 6, the color filter R is selected as a specified color filter mentioned above, so that only when the color filter R is inserted in the optical path, the movement of rear lens group $L_2$ will be shifted from the track $b_1$ to the track $b_2$.

The reason for the selection of the specified color filter R is that the characteristics of the deviation in focus when the color filter R is inserted in the optical path are different from those when the color filters G and B are inserted, and that the deviation in focus when the color filters G and B are inserted in the optical path can be practically adjusted by using a mean focus value (reference) MP. Alternatively, it is possible to select either color filter G or G as the specified color filter, in place of the color filter R, depending on the characteristics of the deviation of focus. Furthermore, it is also possible to independently shift all the tracks of the color filters R, B and G to absorb the deviations in focus which are caused by the insertion of the respective color filters into the optical path. Note that the abscissa of the diagram shown in FIG. 6 is enlarged.

Figure 7:
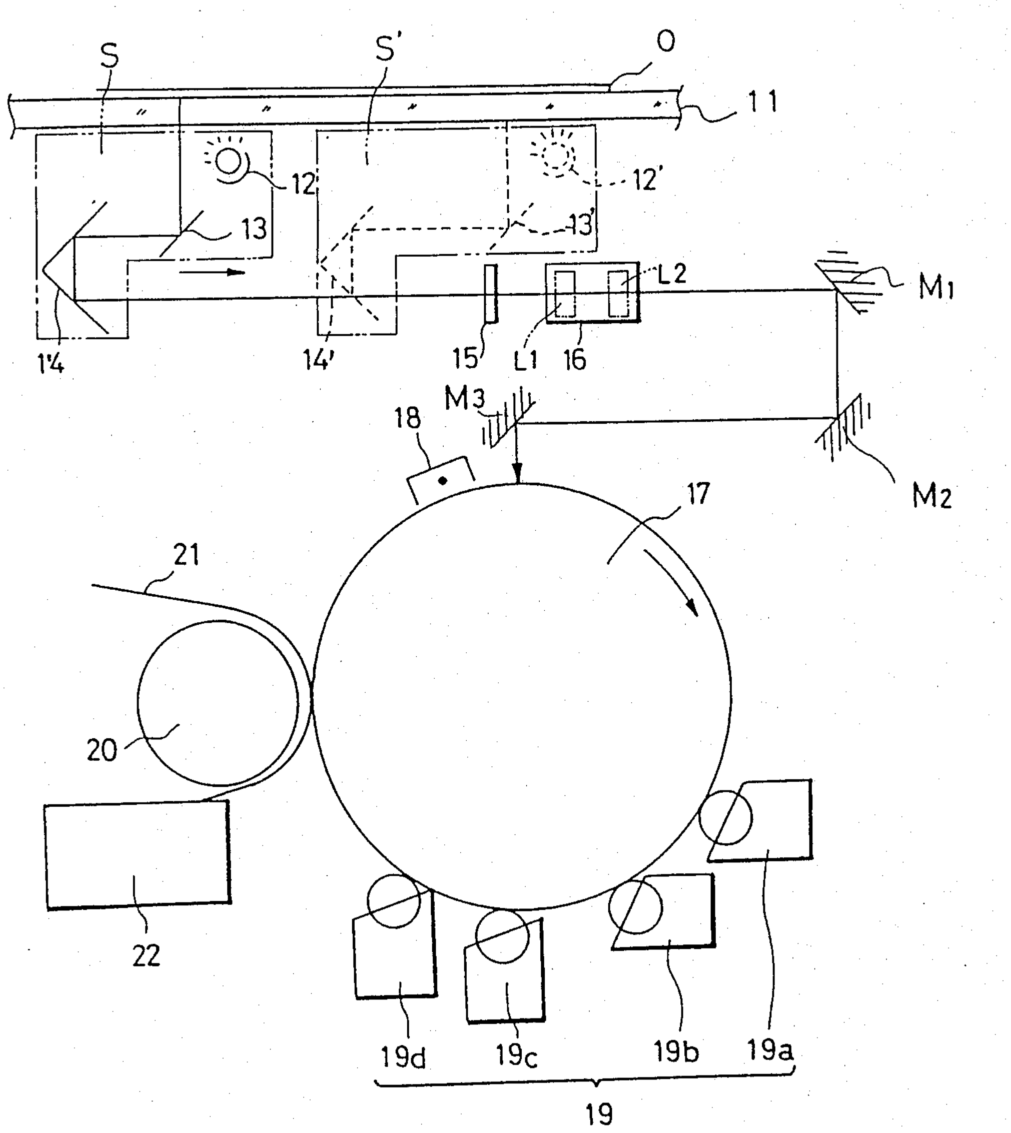
PRIOR ART Fig. 7
FIG. 7 is a schematic view of a known color zoom copying apparatus.

FIGS. 1 to 5 show an optical arrangement in a color zoom copier according to the present invention, corresponding to the color separating device 15 and the zoom lens system 16 in FIG. 7, by way of an example.

A stepping motor 26 is secured onto a base plate 25 which rotatably supports a pair of pulleys 27, 27 which are spaced from one another in the direction of the optical axis X of the zoom lens system 16. On the base plate 25 are secured guide bars 28 which extend in parallel with the optical axis X, on one side of the pulleys 27.

A slide base 29 which is in the form of a generally U-shaped plate in cross section (FIG. 3) is slidably supported on and by the guide bars 28. The front lens group $L_1$, i.e. a lens barrel thereof, is secured onto the slide base 29.

A driving wire 31 which is connected at one end directly to the slide base 29 and at its opposite end through a spring 32 to the slide base is wound around a drive shaft 26*a* of the stepping motor 26 and the pulleys 27, 27, so that the driving wire can be rotated by the stepping motor 26 through the pulleys 27 without slipping. As a result, when the stepping motor 26 rotates, the slide base 29 and accordingly the front lens group $L_1$ move in the optical axis direction. Namely, the front lens group $L_1$ is controlled to move along the track a by the stepping motor 26 in accordance with the change in magnification, as shown in FIG. 6.

On the slide base 29 is supported a movable rear lens frame 33 (FIG. 3) which holds the rear lens group $L_2$ which can move in the direction of the optical axis X. Namely, the movable lens frame 33 has a guide pin 34 secured thereto which is guided in a linear guide groove 35 (FIG. 1) formed in the base plate 25, so that the movable lens frmae 33 can be displaced in the direction of the optical axis X. With this arrangement, the rear lens group $L_2$ can move relatively to the front lens group $L_1$.

A swing lever 37 is rotatably secured onto the slide base 29 through a pin 36. One arm 37*a* of the swing lever 37 is provided with an elongated hole 38 in which the guide pin 34 is fitted. When the swing lever 37 rotates about the pin 36, the movable lens frame 33 and accordingly the rear lens group $L_2$ moves in the optical axis direction.

The other arm 37*b* of the swing lever 37 is provided, on its front end, with a cam follower 40 which is fitted in a cam groove 41 formed in the base plate 25. The cam groove 41 has two cam surfaces at its opposite lateral sides. Namely, cam groove 41 has an upper lateral cam surface 41GB for the color filters G and B and a lower lateral cam surface 41R for the color filter R. The swing lever 37 is continuously biased by a torsion coil spring 42 (FIG. 1) in the clockwise direction in FIG. 1, so that the cam follower 40 normally comes into contact with the cam surface 41GB. The profiles of the cam surfaces 41GB and 41R correspond to track $b_1$ and $b_2$ shown in FIG. 6, respectively.

When the color filter R of the color separating device 15 is inserted in the optical path of the zoom lens system, the swing lever 37 is rotated in the counterclockwise direction against the spring force of the torsion spring 42, so that the cam follower 40 is brought into contact with the cam surface 41R.

The color separating device 15 is provided on one side of the slide base 29.

Color filters R, G, B and M are held by respective filter frames 51, 52, 53 and 54 in parallel with each other. The filter frames 51~54 are supported by upper and lower guide rails 61 and 62 of a guide frame 60, so that the filter frames can independently and linearly move along the guide rails 61 and 62 to selectively insert the color filters into the optical path (optical axis X) of the zoom lens system 16. The color filters are laterally moved in a direction perpendicular to the optical axis X. Namely, the filter frames can be reciprocally moved between a retracted position in which they are retracted from the optical path and an operative position in which the filter frames are located in the optical path, in a direction perpendicular to the optical path.

The guide frame 60 has rotatable pulleys 64 corresponding to the filter frames 51~54. The pulleys 64 are located on the side of the guide frame 60 which is distant from the optical axis X and have spiral springs 64*a* wound thereon and secured thereto, so that the front ends of the spiral springs 64*a* are secured to the lower ends of the filter frames 51~54 by means of respective pins 64*b*. The spiral springs 64*a* are biased in the winding direction so that the filter frames 51~54 are continuously biased toward the retracted position to move away from the optical axis X.

Figure 2:
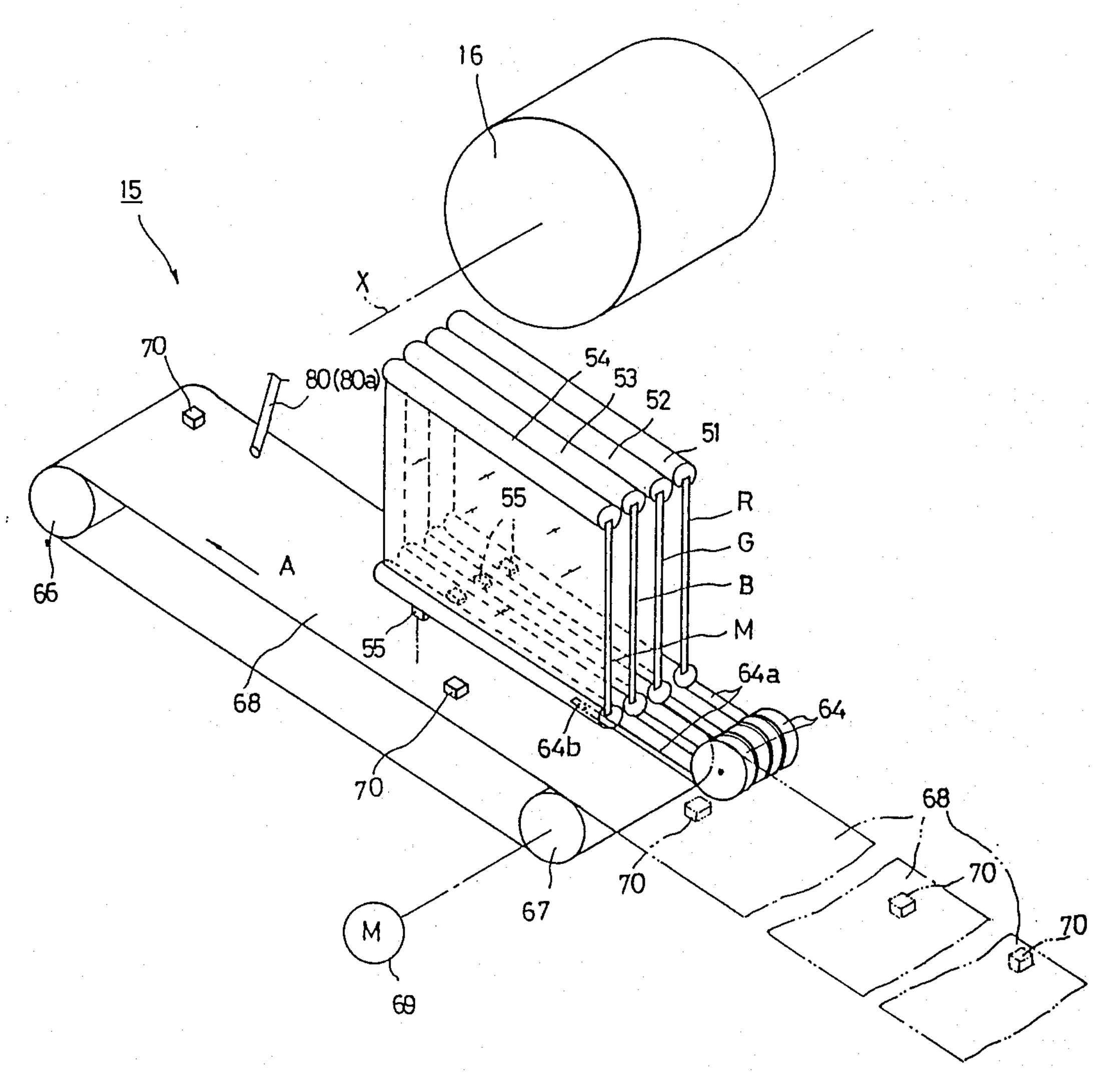
FIG. 2 is a perspective view of a main part of the color separating device shown in FIG. 1.
Figure 4:
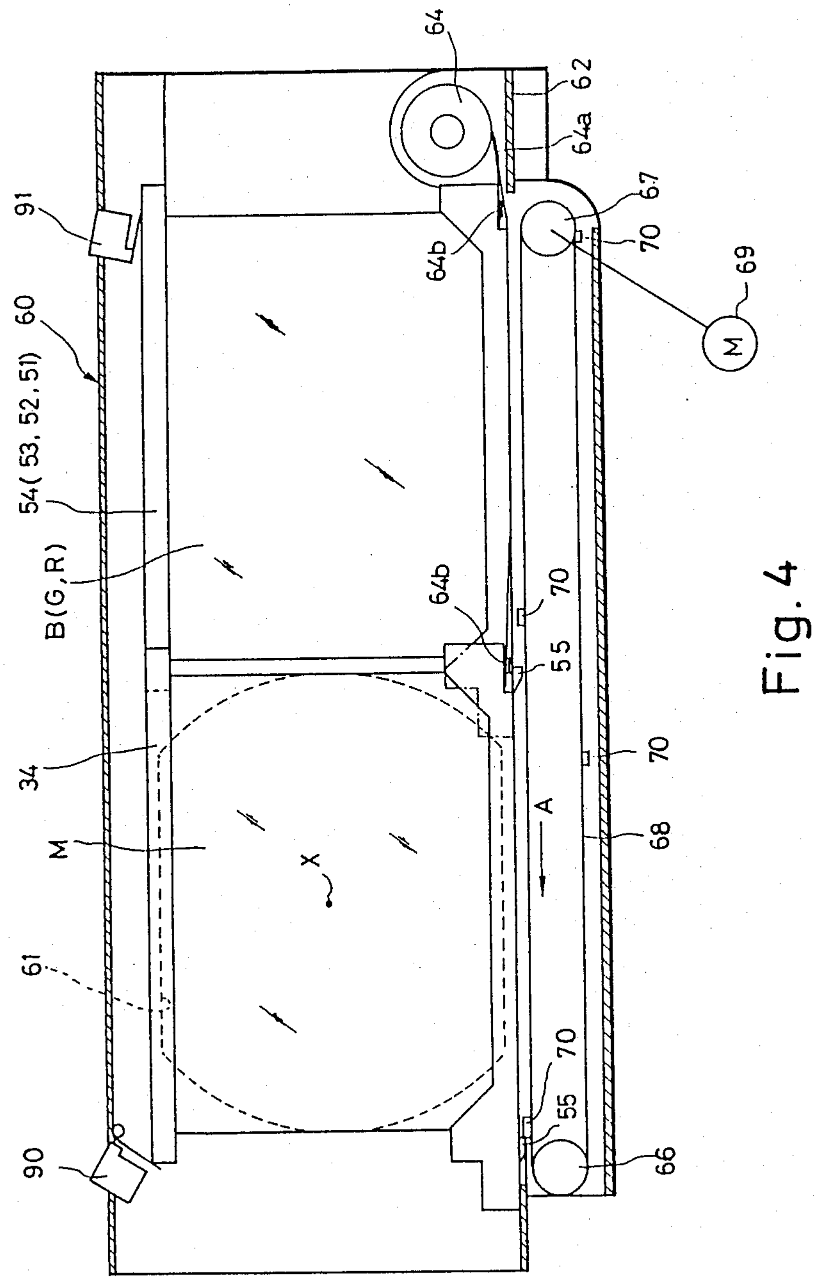
FIG. 4 is a side elevational view of FIG. 1.

Filter frames 51~54 are provided on their lower ends with abutments 55, as can be seen from FIGS. 2 and 4. The guide frame 60 is provided, on its opposite ends in the lengthwise direction of the guide rails 62, with rollers e.g., (sprockets) 66 and 67 below the guide rails 62. An endless belt 68 is wound around the rollers 66 and 67 so as to rotate without slipping. One of the rollers 66 and 67 is connected to a drive 69, such as a motor, so that the endless belt 68 is rotated by the drive 69 at a predetermined timing.

The endless belt 68 has four driving projections 70 corresponding to abutments 55 of the filter frames 51~54, so that when the driving projections 70 come into contact with the abutments 55, the movement of the endless belt 68 in the direction A, shown in FIGS. 2 and 4, causes the filter frames to move in the direction A, i.e., towards the operative position, against the spiral springs 64*a*.

The four driving projections 70 are laterally spaced from one another on the endless belt 48 to correspond to respective abutments 55 of filter frames 51~54. Also, the driving projections 70 are spaced from one another in the direction of the movement of the endless belt 68, so that only one projection 70 comes into contact with corresponding abutments 55 at one time. Namely, only one filter frames 51~54, and accordingly only one of the color filters R, G, B and M can be brought into the optical path of the zoom lens system 16 at one time. In other words, more than two filter frames cannot be simultaneously inserted in the optical path.

In the illustrated arrangement, projections 70 and the abutments 55 are placed in such a way that when one of the projections 70 of the endless belt is disengaged from an associated abutment 55, another projection 70 is engaged by the associated abutment 55 of another filter frame.

Drive 69 for the rotational movement drives the endless belt 68 so that the four driving projections 70 successively come directly above the roller 66. When the driving projections 70 come above the roller 66, that is, when the color filters are successively inserted in the optical path of the zoom lens system 16, the endless belt 68 stops moving. When the color separation by the color filters is completed, the endless belt 68 begins moving again.

The specified color filter R is located closest to the zoom lens system 16. A switching member which is, for example, in the form of a spring member 80 is provided in place, so that it is pressed by the color filter R or the filter frame 51 thereof, which is located in the optical path. The spring member 80 is rotatably supported by a shaft 81 provided on the slide base 29 and has at one end an associated portion 80*a* which is pressed by the color filter R (or the filter frame 51 thereof). The opposite end of the spring member 80 bears against a projection 82 provided on the swing lever 37. When the associated portion 80*a* is pressed by the color filter R or the filter frame 51 which comes into the optical path of the zoom lens system 16, the spring member 80 is rotated about the shaft 81 to rotate the swing lever 37 in the counterclockwise direction through the projection 82, so that the cam follower 40 will come into contact with the cam surface 41R.

Figure 1:
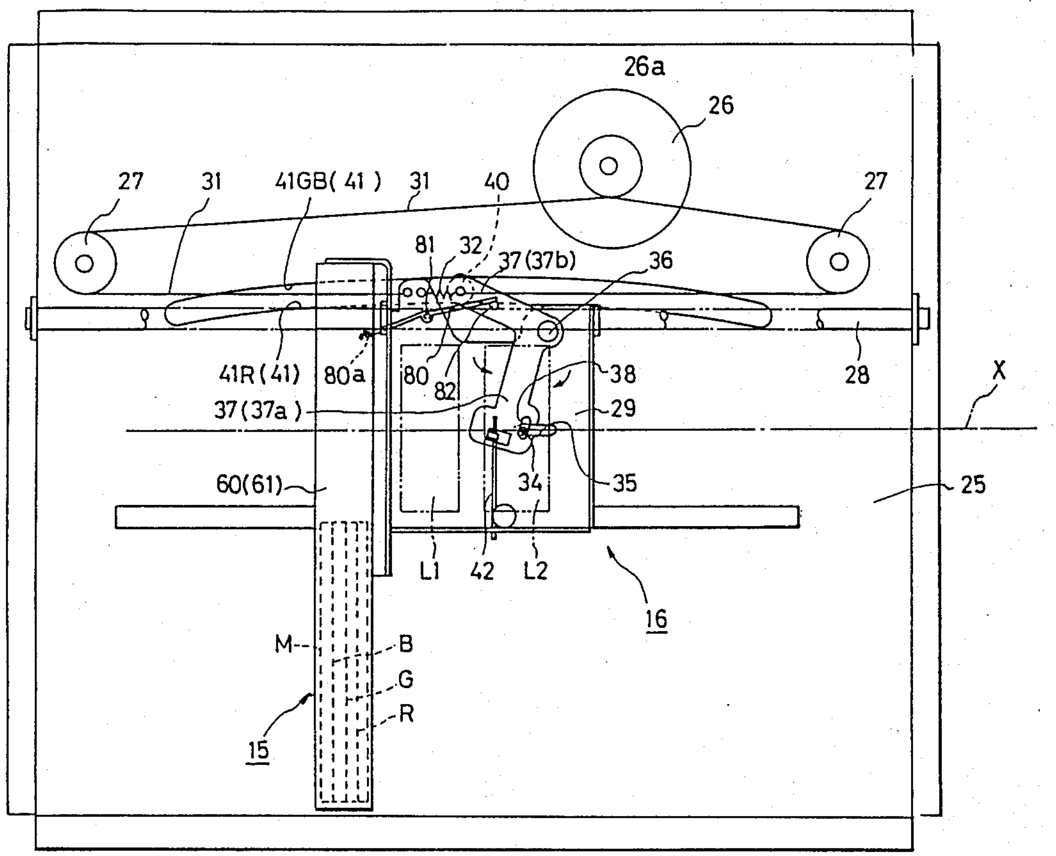
FIG. 1 is a plan view of a color zoom copying apparatus according to an embodiment of the present invention.
Figure 3:
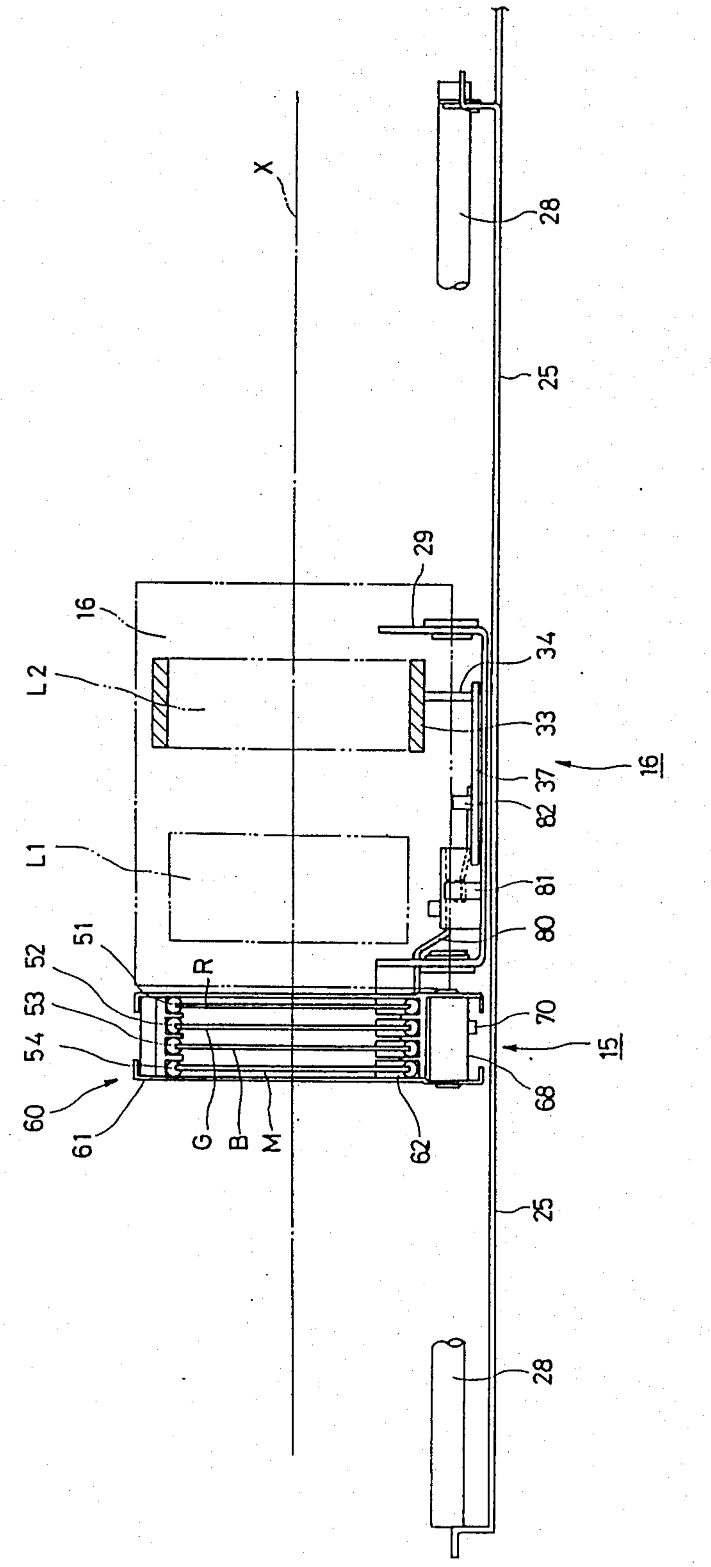
FIG. 3 is a front elevational view of FIG. 1.

The color zoom copying apparatus mentioned above operates as follows:

With the color separating device 15 mentioned above, intermittent rotation of the endless belt 68 at a predetermined timing in the same direction by the drive 69 causes the color filters R, G, B and M to come into the optical path of the zoom lens system 16 in a predetermined order. Namely, assuming that the color filters R, G, B and M are located in this order, as shown in FIGS. 1 to 3, and that the driving projections 70 secured on the endless belt 68 are spaced in the lengthwise direction of the endless belt, as shown in a developed view shown by an imaginary line in FIG. 2, the leftmost driving projection 70 first brings the filter frame 54 of M into the optical path of the zoom lens system 16 at a specific rotational position of the endless belt 68. When that driving projection 70 comes above the roller 66, endless belt 68 stops moving. During stoppage of the endless belt, scanning of document 0 and formation of the latent image on the photoconductive drum 17 are effected.

After that, the endless belt 68 is driven again by drive 69, so that projection 70 which has been engaged by the abutment 55 of filter frame 54 of filter M is disengaged therefrom and comes below roller 66. As soon as the projection 70 is disengaged from the abutment 55 of the filter frame 54, the filter frame 54 is quickly retracted from the optical path toward the initial position (retracted position) by the spring 63*a*.

When filter frame 54 (color filter M) is retracted from the optical path of the zoom lens system 16, the second driving projection 70 from left, as seen in FIG. 1 comes into engagement with abutment 55 of filter frame 53 of color filter B. After that the operations mentioned above are repeated.

By one rotation of the endless belt 68, color filters M, B, G and R are successively brought into the operative position in which the color filters are located in the optical path of the zoom lens system 16 to complete color separation by the color filters.

Figure 5A:
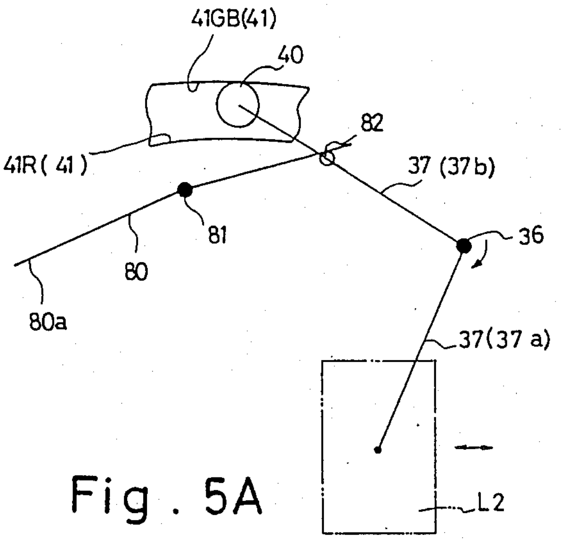
FIGS. 5A and 5B are enlarged skeleton views of a cam mechanism shown in different positions.

When no external force is applied to the associated portion 80*a* of the spring member 80, i.e., when no color filter is located in the optical path or when color filters other than the color filter R are located in the optical path, the swing lever 37 which is biased in the clockwise direction by the torsion coil spring 42 causes the cam follower 40 to come into contact with the cam surface 41GB (FIG. 5A). As a result, the movable lens frame 33, and, accordingly, the rear lens group $L_2$ are controlled to move along the track $b_1$ in relation to the slide base 29 and, accordingly, to the front lens group $L_1$ which is controlled to move along the track a, in accordance with variations in magnification.

Figure 5B:
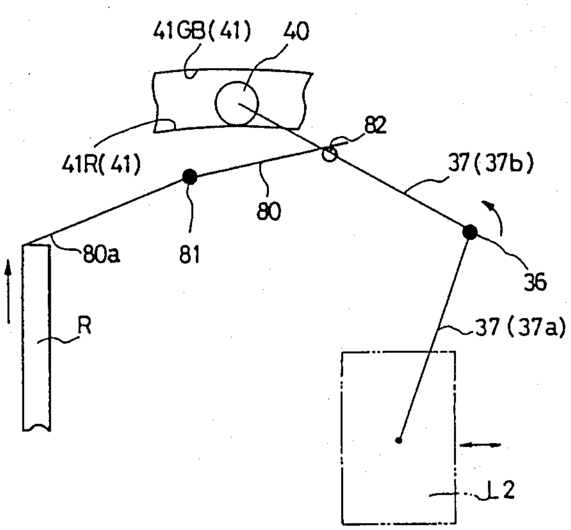

On the other hand, when the color filter R is inserted in the optical path, the associated portion 80*a* of the spring member 80 is pressed by the color filter R or the filter frame 51 thereof to rotate the swing lever 37 in the counterclockwise direction through the projection 82. As a result, cam follower 40 comes into contact with cam surface 41R, as shown in FIG. 5B, so that travel of the rear lens group $L_2$ is shifted to track $b_2$ (FIG. 6). Movement of the rear lens group $L_2$ along track $b_2$ substantially corrects the deviation of focus which would otherwise remain.

The latent images are successively formed on photoconductive drum 17 for the respective color filters. The latent images are developed onto the same recording object (paper). After the developed image is fixed, the paper on which a correctly focused image is copied, regardless of the color of the color filters, is discharged.

Insertion of the color filters into the optical path is effected in synchronization with scanning of the document and the development, the transfer of the latent image, etc., by a detecting means for detecting the insertion and retraction of the color filters into the optical path. The detecting means can be composed of, for example, an insertion detecting microswitch (or microswitches) 90 and a retraction detecting microswitch (or microswitches) 91, as shown in FIG. 4. These microswitches 90 and 91 are actuated by the filter frames 51~54 which are located in the optical path X and which are retracted from the optical path, respectively.

It should be noted that the arrangement of the color filters R, G, B and M and the kind of colors are not limited to those of the illustrated embodiments mentioned above. For example, color filters of yellow, magenta and cyanine can be located in this order. Also, color filters having colors different from the above-mentioned colors can be used.

In the illustrated color separating device, since the color filters held by the filter frames are successively and linearly moved between their operative position and their retracted position by the intermittent rotation of the endless belt, only a small space for linear reciprocal movement of the color filters is needed, resulting in the realization of a compact and simple copying apparatus. Furthermore, according to the present invention, color filters can be automatically and quickly returned to their initial positions (i.e., their retracted positions) by the return springs.

Alternatively, it is also possible to provide a plurality of color filters which are concentrically arranged to surround a rotational shaft. In this alternative, the color filters can be retractably brought into the optical path of the zoom lens system by intermittent rotation of the rotational shaft. Similarly to the above-mentioned embodiment, the associated portion 80*a* of the spring member 80 can be pressed by a specified color filter in a concentrical arrangement, as a further alternative.

We claim:

1. A color zoom copying apparatus having a light source for illuminating an object, a zoom lens system which has a plurality of groups of lenses for projecting an image of the illuminated object, a photoconductive body which receives the image of the object from the zoom lens system, and a color separating device for separating the image of the object into several colors to transfer the thus separated image onto the photoconductive body, said apparatus further comprising a slide base which holds one of the lens groups and which is adapted to move in the optical axis direction of the zoom lens system, means for driving the slide base in the optical axis direction in accordance with the magnification of the zoom lens system, a movable lens frame which supports another lens group and which is supported on the slide base so as to move in the optical axis direction, first adjusting means for moving the movable lens frame relative to the slide base to correct deviations in focus of the zoom lens system occurring as a result of variation in magnification, in accordance with the displacement of the slide base, a plurality of color filters which are adapted to be independently inserted into, and retracted from, the optical path of the zoom lens system, and a second adjusting means for moving the movable lens frame, independently of movement of said lens frame by the first adjusting means, to correct any deviation in focus which is produced when a specified color filter is inserted into the optical path of the zoom lens system and which is determined by the color of the specified color filter, in association with the insertion of the specified color filter.

2. A copying apparatus according to claim 1, wherein said color filters comprise red, green, blue and monochrome filters.

3. A copying apparatus according to claim 1, further comprising a base plate which has guide rails which are adapted to slidably support the slide base.

4. A copying apparatus according to claim 2, wherein said specified clor filter is the red color filter.

5. A copying apparatus according to claim 3, wherein said first and second adjusting means comprise a swing lever which is rotatably supported on the slide base and a cam groove which is formed in the base plate, said swing lever being provided with a cam follower which is fitted in the cam groove.

6. A copying apparatus according to claim 5, wherein said swing lever is connected at one end to the movable lens frame, so that the angular position of the swing lever controls the position of the movable lens frame.

7. A copying apparatus according to claim 5, wherein said cam groove has two cam surfaces which can be selectively engaged by the cam follower.

8. A copying apparatus according to claim 7, wherein one of said cam surfaces of the cam groove constitutes the first adjusting means, and the other cam surface constitutes the second adjusting means.

9. A copying apparatus according to claim 8, further comprising means for biasing the swing lever so that the cam follower normally comes into contact with said one cam surface of the cam groove.

10. A copying apparatus according to claim 1, wherein said driving means comprises a stepping motor which is functionally connected to the slide base to move the latter in the optical axis direction.

11. A copying apparatus according to claim 9, further comprising filter frames which carry the respective color filters.

12. A copying apparatus according to claim 11, wherein said filter frames are located in parallel with each other.

13. A copying apparatus according to claim 11, further comprising a switching member which is pivoted on the slide base and which is pressed by the filter frame of the specified color filter which is inserted in the optical path of the zoom lens system, said switching member being connected to the swing lever, so that when the switching member is pressed by the filter frame of the specified color filter, the swing lever causes the cam follower to come into contact with the other cam surface of the cam groove.

14. A copying apparatus according to claim 11, wherein said color filters are movable in a direction perpendicular to the optical path of the zoom lens system.

15. A copying apparatus according to claim 14, further comprising spring means for biasing the color filters to be retracted from the optical path of the zoom lens system, an endless belt which extends in the direction of movement of the color filters to move the same, means for intermittently driving the endless belt, and means for selectively engaging the endless belt with the associated filter frames to successively bring the color filters into the optical path of the zoom lens system.

16. A copying apparatus according to claim 15, wherein said selectively engaging means comprises driving projections on the endless belt and abutments on the filter frames which are adapted to be selectively engaged by the driving projections of the endless belt.

* * * * *

UNITED STATES PATENT AND TRADEMARK OFFICE
CERTIFICATE OF CORRECTION

PATENT NO. : 4,825,252

DATED : April 25, 1989

INVENTOR(S) : M. SUZUKI ET AL.

It is certified that error appears in the above-identified patent and that said Letters Patent is hereby corrected as shown below:

At column 1, line 8, change "therefor" to ---therefore---.

At column 2, line 34, insert ---,--- after "magnification".

At column 3, line 55, change "wich" to ---which---.

At column 4, line 6, change "G or G" to ---G or B---.

At column 4, line 48, change "frmae" to ---frame---.

At column 4, line 57, change "moves" to ---move---.

At column 5, line 2, change "track" to ---tracks---.

At column 5, line 56, change "48" to ---68---.

At column 8, line 25, change "occurring" to ---which occur---.

At column 8, line 45, change "clor" to ---color---.

Signed and Sealed this

Seventh Day of December, 1993

Attest:

Bruce Lehman

BRUCE LEHMAN

*Attesting Officer*

*Commissioner of Patents and Trademarks*